United States Patent [19]

Numata

[11] Patent Number: 4,712,053
[45] Date of Patent: Dec. 8, 1987

[54] SERVO CONTROL FOR MOTOR HAVING CUTOFF DEVICE FOR PREVENTING MOTOR FROM BEING LOCKED

[75] Inventor: Hidetaka Numata, Furukawa, Japan

[73] Assignee: Alps Electric Co., Ltd., Japan

[21] Appl. No.: 906,559

[22] Filed: Sep. 8, 1986

Related U.S. Application Data

[63] Continuation of Ser. No. 669,104, Nov. 7, 1984, abandoned.

[30] Foreign Application Priority Data

Nov. 8, 1983 [JP] Japan .................. 58-172972

[51] Int. Cl.$^4$ .............................. G05B 1/06
[52] U.S. Cl. ................. 318/663; 318/434; 318/436; 318/469
[58] Field of Search ............ 318/138, 254 A, 254, 318/439, 469, 430, 434, 436, 450, 461, 561, 663

[56] References Cited

U.S. PATENT DOCUMENTS

| | | | |
|---|---|---|---|
| 3,400,315 | 9/1968 | Doucette | 318/663 X |
| 3,483,455 | 12/1969 | Klysa, Jr. et al. | 318/563 |
| 3,644,816 | 2/1972 | Gilbert | 318/663 |
| 3,755,726 | 8/1973 | Knipe et al. | 318/663 X |
| 3,887,844 | 6/1975 | Yoshida | 318/254 A X |
| 3,916,272 | 10/1975 | Grumleitner et al. | 318/254 A X |
| 4,030,005 | 6/1977 | Doemen | 318/439 X |
| 4,270,074 | 5/1981 | Duckworth et al. | 318/138 X |
| 4,295,082 | 10/1981 | Moto et al. | 318/599 |
| 4,591,773 | 5/1986 | Numata | 318/434 X |

FOREIGN PATENT DOCUMENTS

| | | | |
|---|---|---|---|
| 55-141996 | 11/1980 | Japan | 318/663 |
| 58-144585 | 8/1983 | Japan | 318/254 |

Primary Examiner—William M. Shoop, Jr.
Assistant Examiner—Bentsu Ro
Attorney, Agent, or Firm—Guy W. Shoup

[57] ABSTRACT

A device for preventing a motor from being locked comprises a position indicator for indicating a position to be moved in response to rotation of the motor, a position detector for detecting the position being moved in response to rotation of the motor, a servo control unit for supplying a current to the motor so that an output signal from the position detector will be equalized with an indication by the position indicator, a stop detector for detecting stoppage of the motor in response to a differential of the output signal from the position detector, and a cutoff control unit for cutting off the current supplied from the servo control unit to the motor in response to an output signal from the stop detector.

5 Claims, 2 Drawing Figures

SERVO CONTROL FOR MOTOR HAVING CUTOFF DEVICE FOR PREVENTING MOTOR FROM BEING LOCKED

This is a continuation applicaton from application Ser. No. 669,104 filed Nov. 7, 1984 now abandoned.

This invention relates to a servo control having a cutoff device for preventing the motor from being locked, and more particularly to a circuit for cutting off the supply of electric power to the motor when the rotor of the motor is detected as being locked against rotation.

When the rotor of a motor is locked against rotation for some reason during operation of the motor, a large current comparable in magnitude with a starting current flows through the winding of the rotor. The rotor winding is then overheated to damage the motor itself and also parts of a system in which the motor is incorporated.

Conventional devices for preventing motors from being locked cut off the supply of current to the motor to prevent overheating of the motor when a large current continues to flow through the motor for a prescribed period of time.

The prior motor lock prevention devices have determined a locked condition of the motor by detecting a current supplied to the motor. Therefore, the device tends to erroneously detect a variation in the supplied current caused by a change in the motor load as having resulted from a locked condition of the motor, and to cut off the current being fed to the motor, thus stopping operation of the system in which the motor is used. With motors designed to reduce a current flowing in a locked condition for avoiding overheating, such erroneous detection is liable to happen more frequently resulting in more frequent stoppage of operation of the motor-operated system.

SUMMARY OF THE INVENTION

It is an object of the present invention to provide a device for preventing a motor from being locked against rotation through detection of no change of the angular position of the motor rotor for determination of a locked condition.

According to the present invention, a device for preventing a motor from being locked comprises a position indicator for indicating a position to be moved in response to rotation of the motor, a position detector for detecting the position being moved in response to rotation of the motor, a servo control unit for supplying a current to the motor so that an output signal from the position detector will be equalized with an indication by the position indicator, a stop detector for detecting stoppage of the motor in response to a differential of the output signal from the position detector, and a cutoff control unit for cutting off the current supplied from the servo control unit to the motor in response to an output signal from the stop detector.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
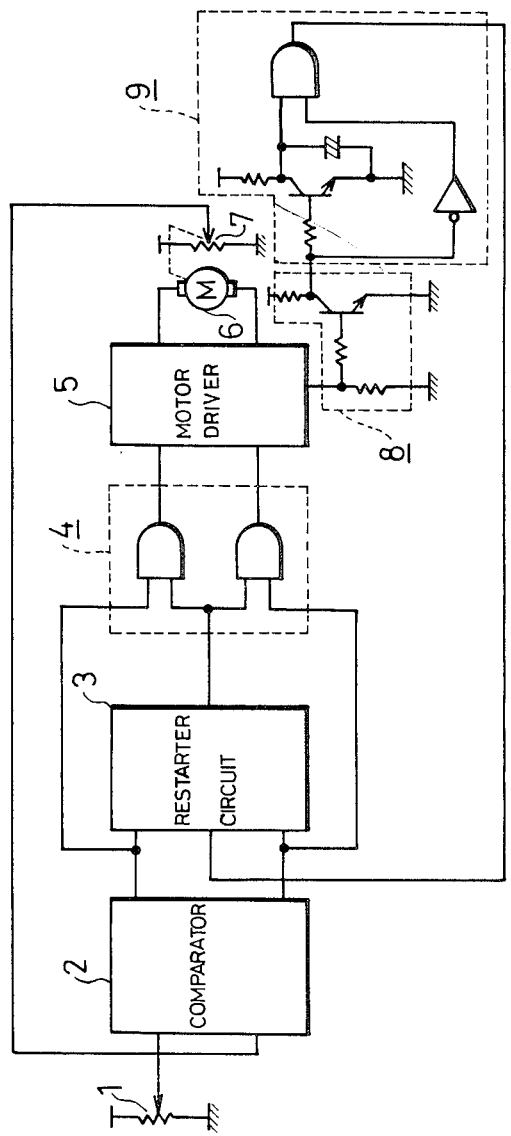
FIG. 1 is a circuit diagram, partly in block form, of a conventional device for preventing a motor from being locked.

Identical reference numerals denote identical or corresponding parts throughout the views.

FIG. 1 shows a servo control circuit for operating a motor to move a rotor to and stop it at a desired position, which has a lock preventing circuit of the current detecting type. The device includes a control rheostat 1, a comparator 2, a restarter circuit 3, a gate circuit 4, a motor driver 5, a motor sensor rheostat 7, a lock detector 8, and a timer 9. The device is combined with a motor 6 for preventing the motor 6 from being locked.

The comparator 2 compares an output voltage from a slider of the motor sensor rheostat 7 mechanically coupled with the motor 6 and an output voltage from a slider of the control rheostat 1. The motor 6 is servo-controlled so that the compared output voltages will be equalized with each other. More specifically, a normal-rotation signal or a reverse-rotation signal is applied from the comparator 2 to the restarter circuit 3 and also to input terminals of two AND gates of the gate circuit 4. The other input terminals of the AND gates are supplied with an output voltage from the restarter circuit 3. An output voltage from either one of output terminals of the two AND gates is applied to the motor driver 5, which supplies a current to the motor 6 for rotating the motor in a normal direction or a reverse direction.

The lock detector 8 serves to check the level of the current supplied from the motor driver 5 to the motor 6 for detecting a locked condition in which the current level exceeds a predetermined level. The timer 9 feeds an output signal of H level to the restarter circuit 3 only when an output signal of L level is supplied to the timer 9 continuously for a predetermined interval of time. When the output signal of H level is applied to the restarter circuit 3, the restarter circuit 3 supplies a signal of L level to the input terminals of the two AND gates of the gate circuit 4. Then, output signals from the gate circuit 4 go low, and the motor driver 5 cuts off a current supplied to the motor 6 in the locked condition. When the motor 6 is to be restarted, the control rheostat 1 is actuated to transmit a variation in the output voltage of the slider thereof to the restarter circuit 3 for thereby releasing the motor from the locked condition.

Since the conventional motor lock prevention device detects the current supplied to the motor 6, it fails to discriminate currents flowing when the motor 6 is actually locked from currents flowing when the motor load is varied.

According to the present invention, the current supplied to the motor 6 is not detected, but a condition in which the motor 6 is not rotated is detected, and the current supplied to the motor 6 is cut off in response to a detected signal for thereby preventing the motor 6 from being subjected to overheating which would otherwise be occasioned by motor locking.

Figure 2:
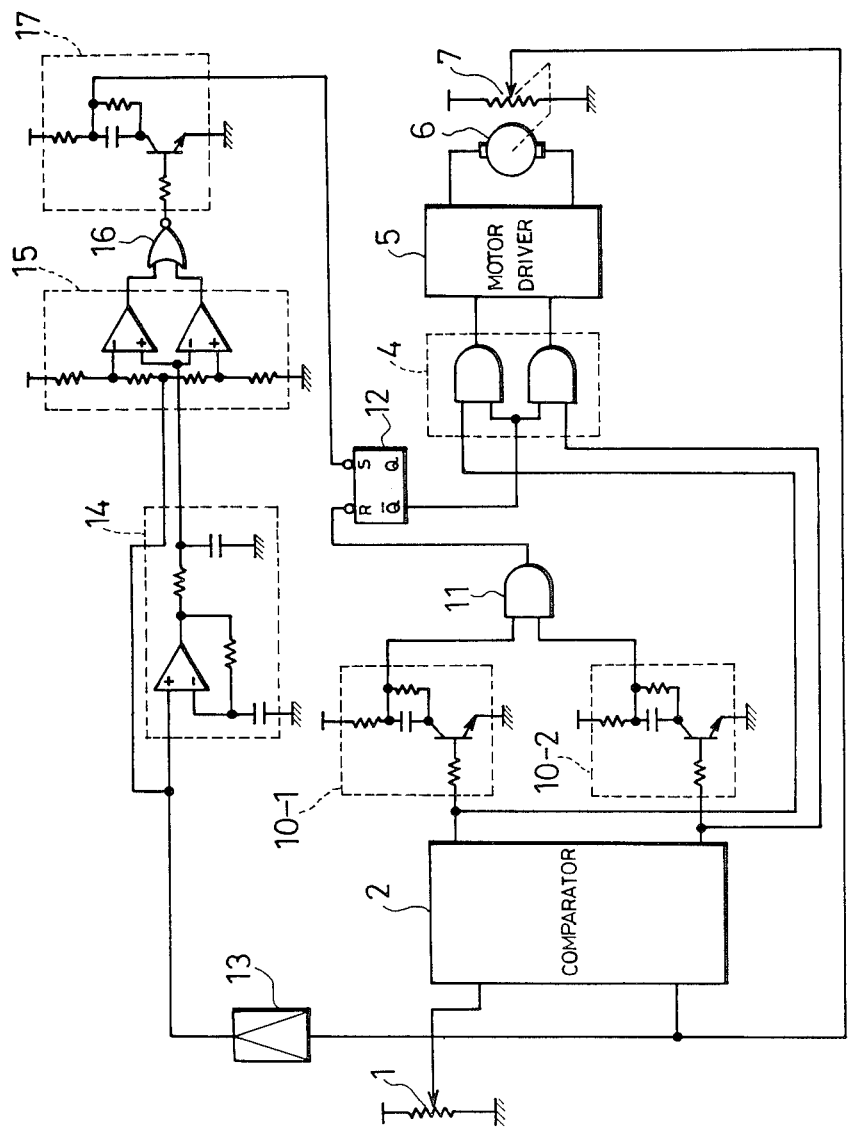
FIG. 2 is a circuit diagram, partly in block form, of a device for preventing a motor from being locked according the present invention.

FIG. 2 shows a servo control circuit for operating a motor which has a lock preventing circuit in accordance with the invention. Parts denoted at 1, 2, 4 and 7 in FIG. 2 are identical or equivalent to those shown in FIG. 1.

The device of FIG. 2 includes an AND gate 11, a NOR gate 16, differentiating circuits 10-1, 10-2, 17, an RS flip-flop 12, a buffer amplifier 13, and a displacement detector 14.

The operation of the servo control circuit will now be described. Initially, the control rheostat 1 is moved by the operator to indicate a desired position the rotor of the motor 6 is to be moved to. The comparator 2 compares the voltage output a of the control rheostat 1 with the voltage output b of the motor sensor rheostat 7, which is a rotor position detector, and supplies signals c and d to the two differentiating circuits 10-1 and 10-2, respectively. Signals of Low (L) level are provided to both differential circuits when the output voltages a and b are the same. A signal of L level is provided to circuit 10-1 and a signal of High (H) level is provided to circuit 10-2 when the voltage a is lower than voltage b. A signal of H level is provided to circuit 10-1 and a signal of L level is provided to circuit 10-2 when the voltage a is higher than voltage b.

The differentiating circuits are each constituted to provide respective outputs e and f which are normally at H level and provide an output pulse signal of L level when an H level signal is input from the comparator 2. That is, each differential circuit has a transistor Q1, Q2 which has an emitter connected to ground, and a collector connected to a positive power supply through a resistor R3, R5 and a parallel circuit of a resistor R4, R6 and a capacitor C1, C2, respectively. The capacitor is normally charged when the impedance of the transistor is kept at a high value, and the output e, f are normally at H level. If the impedance between the collector and the emitter is changed by an H level input to the base from a high value to a low value, the capacitor is rapidly discharged so that the output e, f goes to L level for a predetermined period and then returns to H level.

The outputs e and f of the differentiating circuits 10-1 and 10-2 are inputted to the AND gate 11, and an output g of H level is outputted when both outputs e and f are H level, whereas the output g is at L level when one or both outputs e and f are L level. The output g is provided to Reset terminal R of RS flip-flop 12, which is described further below.

The output voltage b of the motor sensor rheostat 7 is also provided through buffer amplifier 13, and the output j of the same value is supplied to each of the displacement detector 14 and the comparator 15. In the displacement detector 14, the output j is supplied to the (+) input of operational amplifier 14a and the output thereof is supplied as a feedback signal to the (−) input through resistor R7 and stored as a comparison value in capacitor C3 connected between the (−) input and ground. Therefore, the output voltage of the operational amplifier 14a follows variations in the output voltage b of the motor sensor rheostat 7 with a time delay corresponding to the time constant of the resistor R7 and C3. This delayed output is supplied to the capacitor C4 through the resistor R8 to provide a delayed output voltage k of the displacement detector 14.

The output k is compared with the output j in the comparator 15. The comparator 15 has resistors R9, R10, R11, and R12 in series between the power supply and ground, and a pair of operational amplifiers 15a and 15b. The (−) terminal of amplifier 15a is connected to the connection point between resistors R9 and R10, and the (+) terminal of amplifier 15b is connected to the connection point between resistors R11 and R12. The output j is connected to the connection point between resistors R10 and R11. The (+) terminal of amplifier 15a and the (−) terminal of amplifier 15b are connected to the output k of the displacement detector 14. The resistors R9 and R12 have the same high values, and the resistors R10 and R11 have the same low values. When the motor sensor rheostat 7 is driven such that the output voltage b is increasing, the output j is higher than the output k, and when the motor sensor rheostat is driven such that the output voltage b is decreasing, the output j is lower than the output k. Due to the voltages divided across the resistors in series, the outputs l and m of the amplifiers 15a and 15b varies between H and L levels as the relationship between outputs j and k varies. If the motor sensor rheostat output b is constant for a period of time, indicating a stopped condition where the desired position has been reached or a motor locked condition, the outputs j and k will become the same, and both outputs l and m become L level.

The outputs l and m are connected to the inputs of NOR gate 16, which provides output n of H level only when both outputs l and m are L level. The output n of the NOR gate 16 is connected to the differentiating circuit 17, which is constituted similarly to differentiating circuits 10-1 and 10-2 such that it provides an output pulse signal h of L level when the output n of the NOR gate is changed from L level to H level. The output of the differentiating circuit 17 is connected to the Set terminal S of RS flip-flop 12.

The Reset and Set terminals of the flip-flop 12 receive the output g of the AND gate 11 and the output h of the differentiating circuit 17, and are set in operation as a latch circuit to provide the output p from the reverse output terminal $\overline{Q}$. Thus, when the control rheostat is set in either direction to indicate a desired position different from that shown by the motor sensor rheostat 7, and L level pulse of output g is provided to the Reset terminal R from AND gate 11 through differentiating circuits 10-1 and 10-2, resulting in a reset condition and an output p from terminal $\overline{Q}$ of H level. When a stopped or locked condition of the motor is detected through the motor rheostat sensor 7, displacement detector 14, comparator 15, and differentiating circuit 17, an L level pulse of output h is provided to the Set S terminal resulting in an output p of L level.

The output p of the RS flip-flop 12 is supplied to each of the input terminals of the two AND gates 4a and 4b. The other input terminal of AND gate 4a is connected to the output c, and the other input terminal of AND gate 4b is connected to the output d of comparator 2. The outputs q and r of AND gates 4a and 4b, respectively, are connected to the input terminals of the motor driver 5 which drives motor 6 in one or the other direction. When the output p is L level, no H level can be outputted for either output q or r to the motor driver.

Table I below summarizes the various states of operation of the above-described control circuitry, wherein U designates a condition in which the motor 6 is stopped when the rotor has reached the desired position, V1 to V3 the condition in which the motor is driven in one direction to reduce the output voltage or motor sensor rheostat 7 to a lower set voltage a of control rheostat 1, W1 to W3 the condition in which the motor is driven in the other direction to increase the output voltage of motor sensor rheostat 7 to a higher set voltage a, X1 to X3 the condition in which the motor becomes locked while the motor sensor rheostat is moved in the decreasing direction, and Y1 to Y3 the condition in which the motor becomes locked while the motor sensor rheostat is moved in the increasing direction.

TABLE 1

| Condition | a b c d e f g h | j k | l m | n p | q r | s t |
|---|---|---|---|---|---|---|
| U | a=b L L H H H H | j=k=b | L L | H H | L L | L L |
| V₁ | a<b L H H L L H | j<k | H L | L H | L H | L H |
| V₂ | ↓ L H H H H H | ↓ | H L | L H | L H | L H |
| V₃ | a=b L L H H H H | j=k=b | L L | H L | L L | L L |
| W₁ | a>b H L L H L H | j>k | L H | L H | H L | H L |
| W₂ | ↓ H L H H H H | ↓ | L H | L H | H L | H L |
| W₃ | a=b L L H H H H | j=k=b | L L | H L | L L | L L |
| X₁ | a<b L H H L L H | j<k | H L | L H | L H | L H |
| X₂ | ↓ L H H H H H | ↓ | H L | L H | L H | L H |
| X₃ | ↓ L H H H H H | ↓ | L L | H L | L L | L L |
| Y₁ | a>b H L L H L H | j>k | L H | L H | H L | H L |
| Y₂ | ↓ H L H H H H | ↓ | L H | L H | H L | H L |
| Y₃ | ↓ H L H H H L | ↓ | L L | H L | L L | L L |

The RS flip-flop 12 serves to supply a signal of H level to the gate circuit 4 when the motor 6 is started and rotated, and to supply a signal of L level to the gate circuit 4 when the motor 6 is stopped. When the motor 6 is stopped such as when the rotor of the motor 6 is locked against rotation, the output signal from the gate circuit 4 is of L level at all times, and the current supplied to the motor 6 is cut off to prevent the motor 6 from being overheated.

A mode of operation will be described in which the RS flip-flop 12 issues a signal of H level to supply a current to the motor 6 when starting and rotating the motor 6.

When the control rheostat 1 is actuated or rotated in one direction to start the motor 6, the comparator 2 issues a normal-rotation signal of H level or a reverse-rotation signal of L level to the differentiating circuit 10-1 or 10-2. The differentiating circuit 10-1 or 10-2 applies a pulsed signal to the AND gate 11 which supplies a signal of L level to a reset terminal of the RS flip-flop 12 to render an output terminal $\overline{Q}$ of the RS flip-flop 12 high in level. The differentiating circuit 10-1 or 10-2 is operated such that its output becomes a signal of H level when its input is a signal of L level. When its input shows an H level, its output is a pulse having a waveform differentiated in response to the time constant of the resistor and capacitor in the differentiating circuit 10-1 or 10-2 (see FIG. 2). The output signal of H level is then applied from the RS flip-flop 12 to input terminals of the two AND gates of the gate circuit 4, the other input terminals thereof being supplied with the normal-rotation signal of H level or the reverse-rotation signal of L level from the comparator 2. The input signals are then ANDed by the gate circuit 4 to supply an H-level signal to the motor driver 5 for rotating the motor 6 in a normal or reverse direction.

A mode of operation in which the motor 6 is stopped as when its rotor is locked against rotation will be described.

An output voltage from a slide contact of the motor sensor rheostat 7, which is mechanically connected to the rotor of the motor 6, is fed to the displacement detector 14 through the buffer amplifier 13. The displacement detector 14 serves to detect a variation in the output voltage from the motor sensor rheostat 7. The displacement detector 14 issues a voltage close to a power supply voltage (positive or negative) as long as the output signal from the motor sensor rheostat 7 varies.

When the output signal from the motor sensor rheostat 7 does not vary for a predetermined period of time, the capacitor connected between the −input terminal of the operational amplifier of the displacement detector 14 and ground is charged, and the voltage at the output terminal of the displacement detector 14 becomes substantially equal to the output signal from the motor sensor rheostat 7. When supplied two substantially equal output signals, the comparator 15 outputs two signals of L level to the gate 16, which then outputs a signal of H level. If two different signals are supplied to the comparator 15, it provides L and H output signals to the gate 16, which then outputs a signal of L level. When two equal signals are applied to the comparator 15, signals of L level are applied to the gate 16 from which an output voltage signal of H level is supplied to the differentiating circuit 17. Then, a pulsed signal of L level is fed from the differentiating circuit 17 to a set terminal of the RS flip-flop 12 to cause the output terminal $\overline{Q}$ thereof to go low in level. The input terminals of the two AND gates of the gate circuit 4 which are connected to the RS flip-flop 12 now go low in level to cut off the current supplied to the motor 6 for thereby preventing the motor 6 from suffering overheating which would otherwise be caused by locking of the rotor of the motor 6.

With the arrangement of the present invention, the condition of rotation of the motor rotor is detected to determine whether the motor is locked or not, and the current supplied to the motor 6 is cut off if the motor is determined as being locked. The device of the invention can determine a locked condition with higher accuracy for preventing the motor 6 from being overheated than a conventional device in which a locked condition is determined by detecting the current supplied to the motor 6. Even with a small difference between a current flowing when the motor 6 is subjected to a maximum load and a current flowing when the motor 6 is started, a locked condition can accurately be determined for reliable prevention of overheating of the motor 6 and of unwanted current cutoff.

Although a certain preferred embodiment has been shown and described, it should be understood that many changes and modifications may be made therein without departing from the scope of the appended claims.

What is claimed is:

1. A servo control connected to a motor driving circuit for driving the rotor of a motor to a desired position and for preventing the motor from being locked, comprising:
   (a) a rotor position sensor connected to the rotor of the motor for providing a first signal indicative of the actual position of the rotor;
   (b) a rotor position control which is set for providing a second signal indicative of a desired position to which the rotor is to be moved;
   (c) a servo control portion including a comparator for comparing the first signal provided from the rotor position sensor to the second signal provided from the rotor position control and for supplying a driving signal to the motor driving circuit when said first signal differs from said second signal in order to bring the rotor to the desired position;
   (d) a stop detector responsive to said first signal for detecting stoppage of the rotor, due to either the rotor having been moved to the desired position or to the motor becoming locked in position, in order to provide a detection signal indicating stoppage of the rotor; and (e) a cutoff portion for cutting off current from being supplied to the motor from said motor driving circuit in response to the detection signal from the stop detector.

2. A servo control as defined in claim 1, wherein said rotor position sensor is a rheostat mechanically connected to the rotor for outputting a voltage signal in response to variation in resistance value corresponding to the rotor position.

3. A servo control as defined in claim 1, wherein said servo control includes a differentiating circuit responsive to the driving signal provided from said comparator for generating a reset signal when said rotor is to be driven to a desired position, and said stop detector provides said detection signal as a set signal, and said cutoff portion includes a flip-flop circuit responsive to said reset and set signals for providing enabling and cutoff signals to said motor driving circuit.

4. A servo control as defined in claim 1, wherein said stop detector having a first detecting portion for generating a time-delayed signal from said first signal and a comparator portion for comparing the first signal to the time-delayed signal.

5. A servo control as defined in claim 4, wherein said first detecting portion includes an amplifier having said first signal provided as one input and its output provided as a feedback signal through a resistor to its other input, and a capacitor connected between said other input and ground, such that the output of said amplifier follows said first signal with a predetermined time delay.

* * * * *